United States Patent [19]

Pham et al.

[11] Patent Number: 5,109,099
[45] Date of Patent: Apr. 28, 1992

[54] ADVANCING EPOXY RESINS IN PRESENCE OF AMINO GROUP-CONTAINING PHOSPHONIUM CATALYST

[75] Inventors: Ha Q. Pham, Richwood; Allyson J. Malzman; Marvin L. Dettloff, both of Lake Jackson, all of Tex.

[73] Assignee: The Dow Chemical Company, Midland, Mich.

[21] Appl. No.: 568,290

[22] Filed: Aug. 16, 1990

Related U.S. Application Data

[62] Division of Ser. No. 477,368, Feb. 6, 1990, Pat. No. 4,981,926.

[51] Int. Cl.$^5$ ............................................. C08G 59/68
[52] U.S. Cl. ...................................... 528/89; 528/102; 528/112; 525/486
[58] Field of Search ..................... 528/89, 102, 112; 525/486

[56] References Cited

U.S. PATENT DOCUMENTS

| | | | |
|---|---|---|---|
| 3,948,855 | 4/1976 | Perry | 260/47 EP |
| 4,171,420 | 10/1979 | Doorakian et al. | 528/89 |
| 4,302,574 | 11/1981 | Doorakian et al. | 528/89 |
| 4,384,108 | 5/1983 | Campbell et al. | 528/199 |
| 4,471,105 | 9/1984 | Campbell et al. | 528/199 |
| 4,634,757 | 1/1987 | Marshall | 528/89 |
| 4,732,958 | 3/1988 | Jackson et al. | 528/89 |
| 4,808,692 | 2/1989 | Pham et al. | 528/89 |

*Primary Examiner*—Melvyn I. Marquis
*Assistant Examiner*—Robert E. Lee Sellers, II

[57] ABSTRACT

The process of reacting an epoxy resin with a reactive hydrogen-containing compound or a carboxylic acid anhydride in the presence of a phosphonium catalyst is improved by employing a phosphonium compound having an amino substituent on the cation portion of the phosphonium compound as the catalyst. The invention also concerns precatalyzed epoxy resin compositions, curable compositions and cured compositions.

6 Claims, No Drawings 5,109,099

ADVANCING EPOXY RESINS IN PRESENCE OF AMINO GROUP-CONTAINING PHOSPHONIUM CATALYST

CROSS-REFERENCE TO RELATED APPLICATION

This application is a division of application Ser. No. 07/477,368 filed Feb. 6, 1990, now U.S. Pat. No. 4,981,926.

FIELD OF THE INVENTION

The present invention pertains to catalysts for the reaction of reactive hydrogen-containing compounds or acid anhydrides, particularly phenolic hydroxyl- and carboxyl-containing compounds with epoxides, compositions containing such catalysts, to processes employing such catalysts and curable and cured products or articles.

BACKGROUND OF THE INVENTION

High molecular weight epoxy resins have been previously prepared by reacting phenolic compounds with epoxide compounds in the presence of such catalysts as inorganic bases, amines, ammonium salts, phosphine and phosphonium salts such as described in U.S. Pat. Nos. 3,284,212; 3,547,881; 3,477,990; 3,948,855 and 4,438,254. However, most of these catalysts while being suitable for catalyzing the reaction between phenolic hydroxyl-containing compounds and epoxides, most of these catalysts possess some undesirable feature such as poor reactivity which requires high catalyst levels and long reaction times; poor selectivity to the reaction of phenolic hydroxyl groups with epoxides, difficulty in deactivation and the like.

In a continuous process for the production of advanced epoxy resins such as by the extruder process disclosed in U.S. Pat. No. 4,612,156 it would be highly desirable to have available for use in that process a catalyst which would be highly active, highly selective to phenolic hydroxyl groups, and easily deactivated.

It would also be desirable to have a catalyst which will result in fast cures when an epoxy resin is cured with acid anhydrides.

SUMMARY OF THE INVENTION

One aspect of the present invention pertains to a precatalyzed composition comprising (A) at least one compound containing an average of at least one vicinal epoxide group per molecule and (B) at least one phosphonium catalyst having at least one amino group in the cation portion of the catalyst compound.

Another aspect of the present invention pertains to a process for preparing advanced resins by reacting one or more compounds having an average of more than one vicinal epoxide group per molecule with one or more compounds having an average of more than one, but not more than about two hydrogen atoms which are reactive with a vicinal epoxide group per molecule in the presence of a phosphonium catalyst having at least one amino group in the cation portion of the catalyst compound; with the proviso that the composition can contain minor amounts of one or more compounds having an average of more than two hydrogen atoms which are reactive with a vicinal epoxide group per molecule which amounts are insufficient to cause gellation of the reaction mixture.

By gellation, it is meant that the product of the reaction is not sufficiently crosslinked so as to render it insoluble or infusible.

A further aspect of the present invention pertains to a curable composition comprising (A) at least one vicinal epoxide-containing compound; (B) at least one phosphonium compound having an amino group in the cation portion of the phosphonium compound; and (C) a suitable curing agent for said epoxy-containing compound, which curing agent contains (1) a plurality of hydrogen atoms reactive with a vicinal epoxide group or (2) one or more acid anhydride groups or (3) a combination of hydrogen atoms reactive with a vicinal epoxide group and acid anhydride groups.

A still further aspect of the present invention pertains to the product or article resulting from curing the aforementioned curable composition.

The catalysts of the present invention are highly active, high selective to phenolic hydroxyl groups, and easily deactivated. They also result in fast cures when an epoxy resin is cured with acid anhydrides in their presence.

DETAILED DESCRIPTION OF THE INVENTION

In the process of the present invention, the reactants are reacted together in the presence of the catalyst at any suitable temperature and pressure for a length of time sufficient to advance the resin to the desired molecular weight. Particularly suitable temperatures are from about 50° C. to about 280° C., more suitably from about 100° C. to about 240° C., most suitably from about 120° C. to about 220° C. Suitable pressures include atmospheric, subatmospheric, and superatmospheric pressures. Particularly suitable pressures are those from about 1 psig (6.0 kPa) to about 150 psig (1,034.2 kPa), more suitably from about 5 psig (34.5 kPa) to about 80 psig (551.6 kPa), most suitably from about 10 psig (68.9 kPa) to about 20 psig (137.9 kPa). The time depends upon the particular catalyst and reactants employed as well as to the degree of advancement desired; however, particularly suitable reaction times include from about 0.5 to about 20, more suitably from about 1 to about 8, most suitably from about 2 to about 5 hours.

Suitable such catalysts which can be employed herein include those represented by the following formula

wherein each R is independently hydrogen, a monovalent hydrocarbyl group, a halogen, preferably bromine or chlorine, nitro or —C≡N or OH or alkyl or alkoxy or halogen substituted hydrocarbyl group having from 1 to about 20, more preferably from 1 to about 10, most preferably from 1 to about 6, carbon atoms, or a R" group; R' is a divalent hydrocarbyl group having from 1 to about 20, more preferably from 1 to about 10, most preferably from 1 to about 5, carbon atoms; each R" is independently hydrogen or a monovalent hydrocarbyl group having from 1 to about 20, more preferably from 1 to about 10, most preferably from 1 to about 5, carbon atoms or a halogen, preferably bromine or chlorine, nitro, —C≡N, or —OH substituted hydrocarbyl group having from 1 to about 20, more preferably from 1 to about 10, most preferably from 1 to about 5, carbon atoms; and Z is any suitable anion.

The term "hydrocarbyl" as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated.

Suitable anions include the halides, carboxylates, carboxylate.carboxylic acid complexes, conjugate bases of inorganic acids such as, for example, bicarbonate, tetrafluoborate or phosphate; conjugate bases of phenols, bisphenols or biphenols such as, for example, bisphenol A, bisphenol F, bisphenol K, bisphenol S; and the like.

Particularly suitable such catalysts include, for example, 2-dimethylaminoethyl triphenylphosphonium bromide, 2-dimethylaminoethyl triphenylphosphonium iodide, 2-dimethylaminoethyl triphenylphosphonium chloride, 2-dimethylaminoethyl triphenylphosphonium acetate.acetic acid complex, 2-dimethylaminoethyl triphenylphosphonium phosphate, 2-dimethylaminoethyl dibutyl allylphosphonium bromide, 2-dimethylaminoethyl dibutyl allylphosphonium iodide, 2-dimethylaminoethyl dibutyl allylphosphonium chloride, 2-dimethylaminoethyl dibutyl allylphosphonium acetate.acetic acid complex, 2-dimethylaminoethyl dibutyl allylphosphonium phosphate, 2-dimethylaminoethyl tributylphosphonium bromide, 2-dimethylaminoethyl tributylphosphonium iodide, 2-dimethylaminoethyl tributylphosphonium chloride, 2-dimethylaminoethyl tributylphosphonium acetate.acetic acid complex, 2-dimethylaminoethyl tributylphosphonium phosphate, 2-dimethylaminoethyl triphenylphosphonium tetrafluoborate, 2-dimethylaminoethyl triphenylphosphonium bisphenate, dimethylaminomethyl triphenylphosphonium oxalate, dimethylaminomethyl triphenylphosphonium bromide, dimethylaminomethyl triphenylphosphonium chloride, dimethylaminomethyl triphenylphosphonium acetate.acetic acid complex, dimethylaminomethyl tributylphosphonium oxalate, dimethylaminomethyl tributylphosphonium bromide, dimethylaminomethyl tributylphosphonium chloride, dimethylaminomethyl tributylphosphonium acetate.acetic acid complex, 3-dimethylaminopropyl triphenylphosphonium oxalate, 3-dimethylaminopropyl triphenylphosphonium bromide, 3-dimethylaminopropyl triphenylphosphonium chloride, 3-dimethylaminopropyl triphenylphosphonium acetate.acetic acid complex, 3-dimethylaminopropyl tributylphosphonium oxalate, 3-dimethylaminopropyl tributylphosphonium bromide, 3-dimethylaminopropyl tributylphosphonium chloride, 3-dimethylaminopropyl tributylphosphonium acetate.acetic acid complex, 2-dimethylaminoethyl triphenylphosphonium oxalate, 4-dimethylaminobutyl triphenylphosphonium bromide, 4-dimethylaminobutyl triphenylphosphonium chloride, 4-dimethylaminobutyl triphenylphosphonium acetate.acetic acid complex, 4-dimethylaminobutyl triphenylphosphonium phosphate, 4-diethylaminobutyl triphenylphosphonium bromide, 4-diethylaminobutyl triphenylphosphonium chloride, 4-diethylaminobutyl triphenylphosphonium acetate.acetic acid complex, 4-diethylaminobutyl triphenylphosphonium phosphate, 2-benzylmethylaminoethyl triphenyl phosphonium bromide, 2-benzylmethylaminoethyl triphenyl phosphonium chloride, 2-benzylmethylaminoethyl triphenyl phosphonium acetate.acetic acid complex, 2-benzylmethylaminoethyl triphenyl phosphonium phosphate, 2-methylphenylaminoethyl triphenyl phosphonium bromide, 2-methylphenylaminoethyl triphenyl phosphonium chloride, 2-methylphenylaminoethyl triphenyl phosphonium acetate.acetic acid complex, 2-methylphenylaminoethyl triphenyl phosphonium phosphate, 2-methylisopropylaminoethyl triphenylphosphonium bromide, 2-methylisopropylaminoethyl triphenylphosphonium chloride, 2-methylisopropylaminoethyl triphenylphosphonium acetate.acetic acid complex, 2-methylisopropylaminoethyl triphenylphosphonium phosphate, 2-diisopropylaminoethyl triphenylphosphonium bromide, 2-diisopropylaminoethyl triphenylphosphonium chloride, 2-diisopropylaminoethyl triphenylphosphonium acetate.acetic acid complex, 2-diisopropylaminoethyl triphenylphosphonium phosphate, combinations thereof and the like.

The catalysts employed in the present invention can be prepared by reacting a trihydrocarbyl phosphine with other reagents by several methods described in *Phosphorous Sulfur*, vol. 13 (1), pp 97–105 (1982), by De Castro Dantas et al which is incorporated herein by reference. Particularly suitable phosphines which can be reacted with the other reagants include, for example, the organic phosphines disclosed by Dante et al. in U.S. Pat. No. 3,477,990 which is incorporated herein by reference in its entirety. Some of the catalysts are also available from Aldrich Chemical Company, Inc.

An epoxy compound having an average of more than one vicinal epoxy group per molecule can be employed to produce advanced epoxy resins by the process of the present invention. While minor amounts of epoxy-containing compounds having an average of more than two vicinal epoxy groups per molecule can be employed, it is preferred that the epoxy compound have an average number of epoxy groups per molecule not in excess of about 2.

Suitable such epoxy-containing compounds include the glycidyl thioethers of aromatic or aliphatic or cycloaliphatic compounds having an average of more than one reactive hydrogen atom per molecule, such as those compounds having an average of more than one aliphatic or aromatic or cycloaliphatic hydroxyl, carboxyl, thiol, or primary or secondary amino group per molecule and the like. Particularly suitable epoxy-containing compounds include, for example, the diglycidyl ethers of compounds containing two aliphatic hydroxyl groups per molecule or two aromatic hydroxyl groups per molecule or two cycloaliphatic hydroxyl groups per molecule or any combination thereof including such compounds as those having one aromatic hydroxyl group per molecule and the other being an aliphatic or cycloaliphatic hydroxyl group per molecule. Preferably, the epoxy-containing compound is a diglycidyl ether of biphenol, bisphenol A, bisphenol F, bisphenol K, bisphenol S, or the $C_1$–$C_4$ alkyl or halogen, preferably bromine, substituted derivatives thereof. Also, particularly suitable are the glycidyl esters of aliphatic, cycloaliphatic or aromatic carboxylic acids or acid anhydrides. Particularly suitable are the glycidyl esters of those acids or anhydrides having from about 2 to about 30, more suitably from about 2 to about 20, most suitably from about 2 to about 10, carbon atoms per molecule. Preferably, the glycidyl ester compounds include, for example, the glycidyl esters of glutaric acid, phthalic acid, hexahydrophthalic acid, succinic acid, maleic acid, pyromellitic acid, tetrahydrophthalic acid, adipic acid, combinations thereof and the like.

The reaction mixture of precatalyzed composition employed in the preparation of an advanced epoxy resin can also, if desired, contain minor amounts of a compound having an average of more than 2 vicinal epoxide groups per molecule. By the term "minor amounts", it is meant that such compounds are employed in amounts such that the resultant product does not result in a compound which is sufficiently crosslinked so as to render the resulting compound incapable of being further cured with a suitable epoxy resin curing agent, if the advanced resin is terminated in epoxy groups or with an epoxy resin if the advanced resin is terminated in a group containing hydrogen atoms reactive with a vicinal epoxide. Suitable such epoxy resins include, for example, the polyglycidyl ethers of phenolaldehyde novolac resins, alkyl or halogen substituted phenol-aldehyde novolac resins, alkyldiene-phenol resins, cycloalkyldiene-phenol resins, alkyldiene-substituted phenol resins, cycloalkyldiene-substituted phenol resins, combinations thereof and the like. Particularly suitable such epoxy resins include, for example, the polyglycidyl ethers of phenol-formaldehyde novolac resins, cresol-formaldehyde novolac resins, bromophenol-formaldehyde novolac resins, cyclopentadiene-phenol resins, dicyclopentadiene-phenol resins, higher oligomers of cyclopentadiene-phenol resins, combinations thereof and the like.

Suitable compounds having an average of more than one hydrogen atom reactive with an epoxide group per molecule which can be employed in the process of the present invention to react with the compound having an average of more than one vicinal epoxide group per molecule to produce an advanced resin include those compounds having an average or more than one, preferably an average of about 2 aromatic hydroxyl or thiol groups per molecule or an average of more than one, preferably an average of about 2 carboxyl groups per molecule. Particularly suitable such compounds include biphenol, alkyl or alkoxy or halogen substituted biphenol, bisphenols, alkyl or alkoxy or halogen substituted bisphenols, aliphatic dicarboxylic acids, cycloaliphatic dicarboxylic acids, aromatic dicarboxylic acids, or any combination thereof and the like. Preferably the compound having an average of more than one reactive hydrogen atom per molecule is biphenol, bisphenol A, bisphenol AP (1,1-bis(2-hydroxyphenyl)-1-phenylethane), bisphenol F, bisphenol K, bisphenol S, or the $C_1$–$C_4$ alkyl or halogen, preferably bromine, substituted derivatives thereof, glutaric acid, phthalic acid, hexahydrophthalic acid, succinic acid, maleic acid, pyromellitic acid, tetrahydrophthalic acid, adipic acid, combinations thereof and the like.

The reaction mixture can also, if desired, contain minor amounts of a compound having an average of more than two hydrogen atoms which are reactive with an epoxide group per molecule. By the term "minor amounts", it is meant that such compound are employed in amounts such that the resultant product does not result in a compound which is sufficiently crosslinked so as to render the resulting compound incapable of being further cured with a suitable epoxy resin curing agent when the advanced resin is terminated in epoxide groups or a compound containing vicinal epoxide groups if the advanced resin is terminated in a group containing hydrogen atoms reactive with vicinal epoxide groups. Suitable such compound include, for example, phenol-aldehyde novolac resins, alkyl or halogen substituted phenol-aldehyde novolac resins, alkyldiene-phenol resins, cycloalkyldiene-phenol resins, alkyldiene-substituted phenol resins, cycloalkyldiene-phenol resins, combinations thereof and the like. Particularly suitable such compounds include phenol-formaldehyde novolac resins, cresol-formaldehyde resins, bromophenol-formaldehyde novolac resins, cyclopentadiene-phenols resins, combinations thereof and the like.

Suitable compounds containing an anhydride group which can be employed herein as a curing agent for epoxy resins include aliphatic, cycloaliphatic or aromatic acid anhydrides having suitable from about 4 to about 30, more suitably from about 4 to about 20, most suitably from about 4 to about 10, carbon atoms. Particularly suitable acid anhydrides include, for example, phthalic anhydride, succinic anhydride, hexahydrophthalic anhydride, methylhexahydrophthalic anhydride, glutaric anhydride, methyl bicyclo(2.2.1)heptene-2,3-dicarboxylic anhydride isomers (Nadic Methyl Anhydride available from Allied Chemical), maleic anhydride, pyromellitic anhydride, polyadipic acid anhydride, combinations thereof and the like.

The epoxy resin and the reactive hydrogen-containing compound are employed in amounts which result in a compound terminated in either an epoxide group or a group containing a reactive hydrogen atom. The compound are employed in amounts which provide a reactive hydrogen atom to epoxy group ratio suitably from about 0.1:1 to about 10:1, more suitably from about 0.2:1 to about 5:1, most suitably from about 0.3:1 to about 1:1.

When an acid anhydride is employed, it is employed in a mole ratio of acid anhydride to epoxy group suitably from about 0.4:1 to about 1.25:1, more suitably from about 0.5:1 to about 1.2:1, most suitably from about 0.6:1 to about 1.1:1.

Although the process of the present invention for preparing advanced epoxy resins can be conducted in a batch process, it is preferably conducted continuously in an extruder such as described by Heinemeyer and Tatum in U.S. Pat. No. 4,612,156 which is incorporated herein by reference in its entirety.

Suitable curing agents which can be employed herein in the curable compositions include, acid anhydrides and compounds containing an average of more than one, preferably more than two hydrogen atoms which are reactive with vicinal epoxide group per molecule.

Suitable compound containing an anhydride group which can be employed herein as a curing agent for vicinal epoxide-containing compounds or resins include aliphatic, cycloaliphatic or aromatic acid anhydrides having suitably from about 4 to about 30, more suitably from about 4 to about 20, most suitably from about 4 to about 10, carbon atoms. Particularly suitable acid anhydrides include, for example, phthalic anhydride, succinic anhydride, hexahydrophthalic anhydride, methylhexahydrophthalic anhydride, glutaric anhydride, methyl bicyclo(2.2.1)heptene-2,3-dicarboxylic anhydride isomers (Nadic Methyl Anhydride available from Allied Chemical), maleic anhydride, pyromellitic anhydride, polyadipic acid anhydride, combinations thereof and the like.

Suitable compounds containing groups reactive with a vicinal epoxide which can be employed as curing agents herein include, aliphatic polyamines, cycloaliphatic polyamines, aromatic polyamines, compounds containing an average of more than two aromatic hydroxyl groups per molecule such as phenolaldehyde novolac resins, alkyl or halogen substituted phenol-aldehyde novolac resins, alkyldiene-phenol resins, cycloalkyldiene-phenol resins, alkyldiene-substituted phenol resins, cycloalkyldiene-phenol resins, combinations thereof and the like. Particularly suitable such compounds include ethylenediamine, diethylenetriamine, triethylenetetramine, tetraethylenepentamine, isophoronediamine, metaphenylenediamine, methylenedianiline, diaminodiphenyl sulfone, phenol-formaldehyde novolac resins, cresol-formaldehyde resins, bromophenol-formaldehyde novolac resins, cyclopentadiene-phenol resins, combinations thereof and the like.

The curing agent are employed in amounts which are suitable to cure the vicinal epoxide-containing resin or compound. Usually from about 0.75 to about 1.25, preferably from about 0.85 to about 1.15, more preferably from about 0.95 to about 1.05 equivalents of curing agent per epoxide group is employed.

The compositions of the present invention can contain or the process of the present invention can be conducted in the presence of any solvent or diluent which is essentially inert to the composition at ordinary temperature. Suitable such solvents or diluents include, for example, alcohols, esters, glycol ethers, ketones, aliphatic and aromatic hydrocarbons, combinations thereof and the like. Particularly suitable such solvents or diluents include, for example, isopropanol, n-butanol, tertiary butanol, acetone, methyl ethyl ketone, methyl isobutyl ketone, butylene glycol methyl ether, ethylene glycol methyl ether, ethylene glycol ethyl ether, ethylene glycol n-butyl ether, ethylene glycol phenyl ether, diethylene glycol n-butyl ether, diethylene glycol ethyl ether, diethylene glycol methyl ether, propylene glycol methyl ether, propylene glycol ethyl ether, propylene glycol n-butyl ether, propylene glycol phenyl ether, dipropylene glycol methyl ether, dipropylene glycol n-butyl ether, tripropylene glycol methyl ether, any combination thereof and the like.

The compositions and process can employ the solvent or diluent in any desired proportion to provide suitable dilution, suitable solution viscosity and the like. Particularly suitable amounts include, for example, from about 0.1 to about 70, more suitably from about 0.5 to about 50, most suitably from about 1 to about 30, percent by weight based upon the weight of the epoxy-containing reactant.

When an extruder is employed in the process for preparing advanced epoxy resins, the amount of solvent will usually be less than about 10, preferably less than about 5, more preferably less than about 3 percent by weight of the combined weight of epoxy-containing compound, compound reactive with the epoxy-containing compound and solvent. In the event that it is desired that the resultant product contain a larger amount of solvent, then additional amounts can be added after the advanced resin has been prepared in the extruder.

The following examples are illustrative of the invention, but are not to be construed as to limiting the scope thereof in any manner.

EXAMPLE 1

Into a one-liter, 5-necked glass reactor equipped with a mechanical stirrer, a thermometer connected to a temperature controller and a heating mantle is charged 398 grams (2.12 equivalents) of a diglycidyl ether of a bisphenol A, having an epoxide equivalent weight (EEW) of 187.6. After purging the reactor with nitrogen and warming the resin to 80° C., 202 grams (1.772 equivalents) of bisphenol A is added and the contents are mixed for 15 minutes at 80° C. Then 0.943 gram of 24.78% 2-dimethylaminoethyl triphenylphosphonium bromide in methanol (0.56 milliequivalent) is added to the epoxy resin/bisphenol A slurry and the temperature is gradually increased to 150° C. over a period of 45 minutes.

At this time, the heating is turned off and an exotherm is allowed to take place. After the exotherm, the reaction is maintained at 170° C. for an additional four hours. The advanced product has an EEW of 1735 or 102% of targeted EEW.

EXAMPLE 2

Into a one-liter, 5-necked glass reactor equipped with a mechanical stirrer, a thermometer connected to a temperature controller and a heating mantle is charged 300 grams (1.599 equivalents) of a diglycidyl ether of bisphenol A having an EEW of 187.6. After purging the reactor with nitrogen and warming the resin to 130° C., 105.7 grams of bisphenol A (0.927 equivalent) is added and the contents are mixed until all bisphenol is dissolved at 120° C. Immediately 0.37 gram of 24.78% of 2-dimethylaminoethyl triphenylphosphonium bromide in methanol solution (0.22 milliequivalent) is added to the resin/bisphenol A slurry and a timer started (t=0). Samples are taken at time intervals and analyzed for epoxide content. The results are reported in Table I.

COMPARATIVE EXPERIMENT A

The procedure of Example 2 is followed except the catalyst is ethyltriphenylphosphonium bromide. The results are reported in Table I.

COMPARATIVE EXPERIMENT B

The procedure of Example 2 is followed except the catalyst is ethyltriphenylphosphonium acetate.acetic acid complex. The results are reported in Table I.

COMPARATIVE EXPERIMENT C

The procedure of Example 2 is followed except the catalyst is tetrabutylphosphonium bromide. The results are reported in Table I.

COMPARATIVE EXPERIMENT D

The procedure of Example 2 is followed except the catalyst is N-methylmorpholine. The results are reported in Table I.

TABLE I

|  | % EPOXIDE AT INDICATED TIME INTERVAL | | | | |
| --- | --- | --- | --- | --- | --- |
|  | 60 min. | 120 min. | 180 min. | 240 min. | 300 min. |
| Example 2 | 14.58 | 12.55 | 10.88 | 9.38 | 8.07 |
| Comp. Expt. A* | 14.97 | 13.39 | 12.02 | 10.77 | 9.70 |
| Comp. Expt. B* | 14.82 | 13.94 | 12.33 | 10.97 | 9.73 |
| Comp. Expt. C* | 15.38 | 13.93 | 12.65 | 11.53 | 10.60 |
| Comp. Expt. D* | 15.92 | 14.88 | 13.92 | 13.05 | 12.29 |

*Not an example of the present invention.

The data in Table I shows that 2-dimethyl aminoethyl triphenylphosphonium bromide is a more reactive, efficient catalyst than other phosphonium or amine catalyst as indicated by the lower epoxide values for a given reaction time.

EXAMPLE 3

A. A mixture comprised of 451.75 grams of diglycidyl ether of bisphenol A having EEW of 180.7 (2.5 equivalents), 285 grams of bisphenol A (2.5 equivalents) and 184.25 grams of the acetate ester of propylene glycol methyl ether is warmed up to 90° C. and thoroughly mixed. The mixture is then divided into equal small portions of 10 grams each.

B. Into a 2 ox. (59 ml) glass bottle is weighed accurately 10 grams of the above-mentioned resin/bisphenol A/acetate ester of propylene glycol methyl ether mixture. 0.1811 gram of a 24.78% 2-dimethylaminoethyl triphenylphosphonium bromide in methanol (4 milliequivalents) is added and then mixed thoroughly. The 2 ox. (59 ml) glass bottle is capped and placed in a convection oven controlled at 50° C. Samples are taken at time intervals to measure viscosity at 25° C. using an ICI cone and plate viscometer. Results are listed in Table II.

COMPARATIVE EXPERIMENT E

Following the identical procedure described in Example 3, a mixture containing 0.1155 gram of 34.82% of ethyl triphenylphosphonium bromide (4 milliequivalents) is added to 10 grams of the epoxy/bisphenol/acetate ester of propylene glycol methyl ether mixture.

COMPARATIVE EXPERIMENT F

Following the identical procedure described in Example 3, a mixture containing 0.1657 gram (4 milliequivalents) of 27.34% ethyl triphenyl phosphonium iodide catalyst in methanol is added to 10 grams of the epoxy/bisphenol/acetate ester of propylene glycol methyl ether mixture.

TABLE II

| VISCOSITY (CPS) AFTER AGING AT 50° C. | | | | |
| --- | --- | --- | --- | --- |
| | 0 (hrs) | 24 (hrs) | 48 (hrs) | 54 (hrs) |
| Example 3 | 500 | 5,125 | 21,000 | 46,000 |
| Comp. Expt. E* | 500 | 3,250 | 9,000 | 19,000 |
| Comp. Expt. F* | 500 | 3,500 | 9,500 | 18,000 |

*Not an example of the present invention.

The data in Table II clearly shows that the 2-dimethylaminoethyl triphenylphosphonium bromide catalyst is more reactive than the conventional phosphonium catalysts as indicated by the higher viscosities at the indicated time period.

EXAMPLE 4

High Molecular Weight Resin Advancement

Into a one-liter, 5-necked glass reactor equipped with a mechanical stirrer, a thermometer connected to a temperature controller and a heating mantle is charged 322.85 grams (1.72 equivalents) of a diglycidyl ether of bisphenol A, having an epoxide equivalent weight (EEW) of 187.6. After purging the reactor with nitrogen and warming the resin to 80° C., 56 grams of ethylene glycol n-butyl ether is added to the reactor. After mixing for 10 minutes, 177.15 grams of bisphenol A (1.55 equivalents) is added and the content mixed for 15 minutes at 80° C. Then 1.45 grams of 32.44% 2-dimethyl aminoethyl triphenylphosphonium bromide in methanol (1.13 milliequivalents) is added to the epoxy/bisphenol A slurry and the temperature gradually increased to 150 ° C. over a period of 45 minutes. At this time, the heating is turned off and an exotherm is allowed to take place. After the exotherm, the reaction is maintained at 160° C. for an additional 4 hours. The advanced product has an EEW of 3172 based on nonvolatiles.

EXAMPLE 5

Pre-Catalyzed Resin Preparation

A pre-catalyzed resin mixture is prepared by weighing 800 grams of a diglycidyl ether of bisphenol A having a percent epoxide of 22.92 and an epoxide equivalent weight of 187.6 into a glass container. 33 grams of xylene is added to the resin and thoroughly mixed. Then 4.93 grams of 32.44% 2-dimethyl aminoethyl triphenylphosphonium bromide in methanol is added to the resin mixture and mixed. The pre-catalyzed resin mixture is then subjected to heat aging in a convection oven controlled at a temperature of 50° C. for 21 days. After 21 days, the pre-catalyzed resin mixture is removed from the oven and cooled to ambient temperature. 470.6 grams of the pre-catalyzed resin mixture is weighted into a one-liter, 5-necked glass reactor equipped with identical equipments as described in Example 1. After adding 30 grams of ethylene glycol n-butyl ether, 129.4 grams of bisphenol A (1.135 equivalents) is added to the reactor and heated to 150 ° C. At this point, heating is turned off and an exotherm is allowed to take place. The temperature is maintained at 160° C. for an additional 2.5 hours. The EEW of the advanced product is 490.

EXAMPLE 6

Reaction of acid anhydride with glycidyl ester 5 g (0.03 equivalent) of diglycidylglutarate, 2.77 g (0.034 equivalent) of a mixture of methylhexahydrophthalic anhydride and hexahydrophthalic anhydride (70/30 weight percent respectively) and $5.39 \times 10^{-4}$ equivalents (based on phosphorus) of catalyst in methanol (70% solids) are combined in an aluminum pan. The mixture is heated for 30 minutes at 82° C. on a Tetrahedron hot plate. After cooling to approximately room temperature, the viscosity of the mixture is determined at 25° C. The different catalysts employed and results are provided in Table III.

TABLE III

| EXPERIMENT | CATALYST | AMOUNT OF CATALYST | | VISCOSITY after 30 min. at 82° C. | |
| --- | --- | --- | --- | --- | --- |
| | | grams | equiv. × $10^{-4}$** | Cps | Pa · s |
| A* | ethyltriphenyl-phosphonium bromide | 0.286 | 5.39 | 3,514 | 3.514 |
| B | 2-dimethylamino-ethyl triphenyl phosphonium bromide | 0.319 | " | 27,091 | 27.091 |
| C* | n-hexyltriphenyl-phosphonium bromide | 0.329 | " | 3,332 | 3.332 |

*Not an example of the present invention.
**The equivalents of catalyst are based on the amount of phosphorous in the catalyst.

The results in Table III show that 2-dimethylaminoethyl triphenylphosphonium bromide is a faster catalyst in catalyzing or accelerating the reaction of an acid anhydride with an epoxide as indicated by the higher viscosity.

What is claimed is:

1. In a process for preparing advanced epoxy resins by reacting (A) one or more compounds having an average of more than one epoxide group per molecule with (B) one or more compounds having an average of more than one, but not more than two, hydrogen atoms reactive with an epoxide group per molecule, with the proviso that one or more compounds having an average of more than two hydrogen atoms per molecule which are reactive with an epoxide group can be present in an amount which is insufficient to cause gellation, in the presence of (C) a catalyst; the improvement which comprises employing as said catalyst, a phosphonium compound having an amino group in the cation portion of the phosphonium compound.

2. A process of claim 1 wherein said compound having an average of more than one epoxide group per molecule, component (A), is a diglycidyl ether of biphenol, an alkyl substituted biphenol, a halogen substituted biphenol, a bisphenol, an alkyl substituted bisphenol, a halogen substituted bisphenol or any combination thereof; and said compound having an average of more than one, but not more than two, hydrogen atom reactive with a compound containing an epoxide group, component (B), is biphenol, an alkyl substituted biphenol, a halogen substituted biphenol, a bisphenol, an alkyl substituted bisphenol, a halogen substituted bisphenol, a dicarboxylic acid, or any combination thereof.

3. A process of claim 1 wherein said compound having an average of more than one epoxide group per molecule, component (A), is a diglycidyl ether of biphenol, bisphenol A, bisphenol F, bisphenol K, bisphenol S or a $C_1$-$C_4$ alkyl or bromine substituted derivatives thereof or any combination thereof; and said compound having an average of more than one, but not more than two, hydrogen atom reactive with a compound containing an epoxide group, component (B), is biphenol, bisphenol A, bisphenol F, bisphenol K, bisphenol S or a $C_1$-$C_4$ alkyl or bromine substituted derivative thereof or any combination thereof.

4. A process of claim 1 wherein said compound having an average of more than one epoxide group per molecule, component (A), is a diglycidyl ester of an aliphatic, cycloaliphatic or aromatic dicarboxylic acid; and said compound having an average of more than one hydrogen atom reactive with a compound containing an epoxide group, component (B), is biphenol, an alkyl substituted biphenol, a halogen substituted biphenol, a bisphenol, an alkyl substituted bisphenol, a halogen substituted bisphenol, a dicarboxylic acid, or any combination thereof.

5. A process of claim 4 wherein said aliphatic, cycloaliphatic or aromatic dicarboxylic acid is phthalic acid, hexahydrophthalic acid, succinic acid, maleic acid, pyromellitic acid, tetrahydrophthalic acid, adipic acid, or any combination thereof.

6. A process of claims 1, 2, 3, 4 or 5 wherein said reaction is conducted in an extruder.

* * * * *